United States Patent [19]
Eckert

[11] 3,930,481
[45] Jan. 6, 1976

[54] FUEL INJECTION SYSTEM FOR INTERNAL COMBUSTION ENGINES

[75] Inventor: Konrad Eckert, Stuttgart, Germany

[73] Assignee: Robert Bosch G.m.b.H., Stuttgart, Germany

[22] Filed: Sept. 12, 1973

[21] Appl. No.: 396,525

[30] Foreign Application Priority Data
Sept. 22, 1972 Germany............................ 2246547

[52] U.S. Cl.. 123/139 AW; 123/32 EA; 123/32 AE
[51] Int. Cl.² ........................................ F02M 39/00
[58] Field of Search ....... 123/139 E, 32 AE, 32 EA, 123/139 AW

[56] References Cited
UNITED STATES PATENTS

| | | | |
|---|---|---|---|
| 3,703,888 | 11/1972 | Eckert............................ | 123/32 AE |
| 3,710,771 | 1/1973 | Anquegrani..................... | 123/139 E |
| 3,765,387 | 10/1973 | Knapp............................. | 123/139 E |
| 3,796,200 | 3/1974 | Knapp............................. | 123/32 AE |
| 3,828,749 | 8/1974 | Knapp............................. | 123/139 E |
| 3,842,813 | 10/1974 | Eckert............................. | 123/119 R |

*Primary Examiner*—Charles J. Myhre
*Assistant Examiner*—R. H. Lazarus
*Attorney, Agent, or Firm*—Edwin E. Greigg

[57] ABSTRACT

A fuel injection system for an internal combustion engine in which the intake air flow is measured and a corresponding electrical signal is generated which governs a pressure control unit so as to modify the fluid pressure acting on a fuel-metering slide-valve piston, displacing it against restoring forces. The axial displacement of the slide-valve piston changes the flow aperture in adjacent metering slits and thus governs the rate of fuel flow to the injection valves of the internal combustion engine and maintains a desired fuel-air ratio.

20 Claims, 2 Drawing Figures

FUEL INJECTION SYSTEM FOR INTERNAL COMBUSTION ENGINES

BACKGROUND OF THE INVENTION

This invention relates, in particular, to a fuel metering and injection system for mixture compressing, externally ignited internal combustion engines. The system includes a fuel line and a metering valve in the fuel line, the valve having a movable valve member which, especially when the movable valve member is embodied as a slide-valve piston, meters out to the air quantity streaming through a suction tube a quantity of fuel in a desired proportion, and where the movable valve member (slide-valve piston) can be actuated by a fluid of changeable pressure to influence the metering process. It is the purpose of such fuel metering and injection systems to create automatically a favorable fuel-air mixture for an internal combustion engine, in order to burn the fuel as completely as possible and, therefore, to avoid or to reduce greatly the formation of toxic exhaust gases while maintaining the highest possible performance or the lowest possible fuel consumption of the internal combustion engine. For this purpose, the desired ratio between air quantity and fuel quantity must be changeable in dependence on engine parameters, such as rpm, load, temperature and exhaust gas composition. Such an adjustment should be possible by the simplest means, i.e. by a simple intercession in the control loop mechanism of the fuel injection system.

In a known fuel injection system of the above-described kind, the slide-valve piston is actuated by a mechanical air measuring element via a lever against a nominally constant return force (pressure fluid). This known fuel injection system is limited with respect to the intercession in the control loop mechanism.

SUMMARY OF THE INVENTION

It is an object of the invention to provide a fuel metering and injection system of the kind described above, taking into account the above-mentioned requirements to be made on such a fuel injection system.

The foregoing object, as well as others which are to be made clear from the text below, is achieved, according to the present invention, by a movable valve member (slide-valve piston) which is actuated by a fluid, against a return force, for the alteration of the metered fuel quantity. The pressure of the control fluid is changeable by means of a pressure control unit, whose control variable is determined by an instrument which measures the air quantity in the suction tube, at least mediately, and where the return force can be provided by a spring having as gentle a characteristic curve as possible. Since it is relatively simple to change the pressure of a fluid, and then to hold the pressure at a particular level, it is also relatively simple to measure the air quantity streaming through the suction tube by any means whatever and then to translate this measured value into some particular determined pressure of the control fluid. Furthermore, it is relatively simple to intercede in this control circuit by influencing the pressure control in dependence on other engine parameters.

According to an advantageous embodiment of the invention, the movable valve member is a slide-valve piston, which is part of a metering valve structure belonging to the distribution system, in which fuel is delivered by a fuel pump through an annular groove of the slide-valve piston to each of several control valves, there being as many control valves as the engine has injection nozzles, the flow aperture cross section of a control valve being variable by means of a resilient member (membrane) that separates two chambers and where, in the first chamber, the pressure prevailing downstream of the metering valve seat acts on the resilient member in the sense of opening the control valve; whereas the second chamber contains the pressure prevailing upstream of the metering valve seat and where the flow aperture cross section of the metering valve is changeable linearly by the axial sliding of the slide-valve piston in that the slide-valve piston uncovers, depending on its axial position, smaller or larger portions of, in particular, metering slits assigned to each injection valve and disposed in a guide bushing parallel to the axis of the slide-valve piston.

According to a supplementary development of the invention, the control fluid is engine fuel which is supplied to the movable valve member (slide-valve piston) through a conduit within which the pressure control unit is interposed. The pressure control unit can advantageously be a nearly hysteresis-free solenoid valve, whose magnetic field strength is variable in dependence on the air quantity streaming through the suction tube, as well as in dependence on engine parameters, such as load, temperature, and exhaust gas contaminants or poisons.

It is advantageous if the instrumentality measuring the air in the suction tube operates with electrical means which create an electrical parameter value corresponding to the air quantity and serving to determine the value of the control variable of the pressure control unit, and where it is also advantageous to measure the metered fuel quantity using electrical means and where this measured datum can be compared with the air quantity datum, in particular by means of a circuit which corresponds in its action to a bridge circuit and where the differential value deriving from the comparison determines the magnitude of the control variable of the pressure control unit. In this way, it is possible to gain access to the control loop easily with electrical means.

A further advantage consists in that the location for the air quantity measurement in the suction tube and the location for the fuel metering, as well as the pressure control unit, can be disposed at any desired place within the engine compartment and need only be connected via cables.

Two exemplary embodiments of the present invention are shown, in simplified form, in the accompanying drawing.

DESCRIPTION AND OPERATION OF THE EMBODIMENTS

Figure 1:
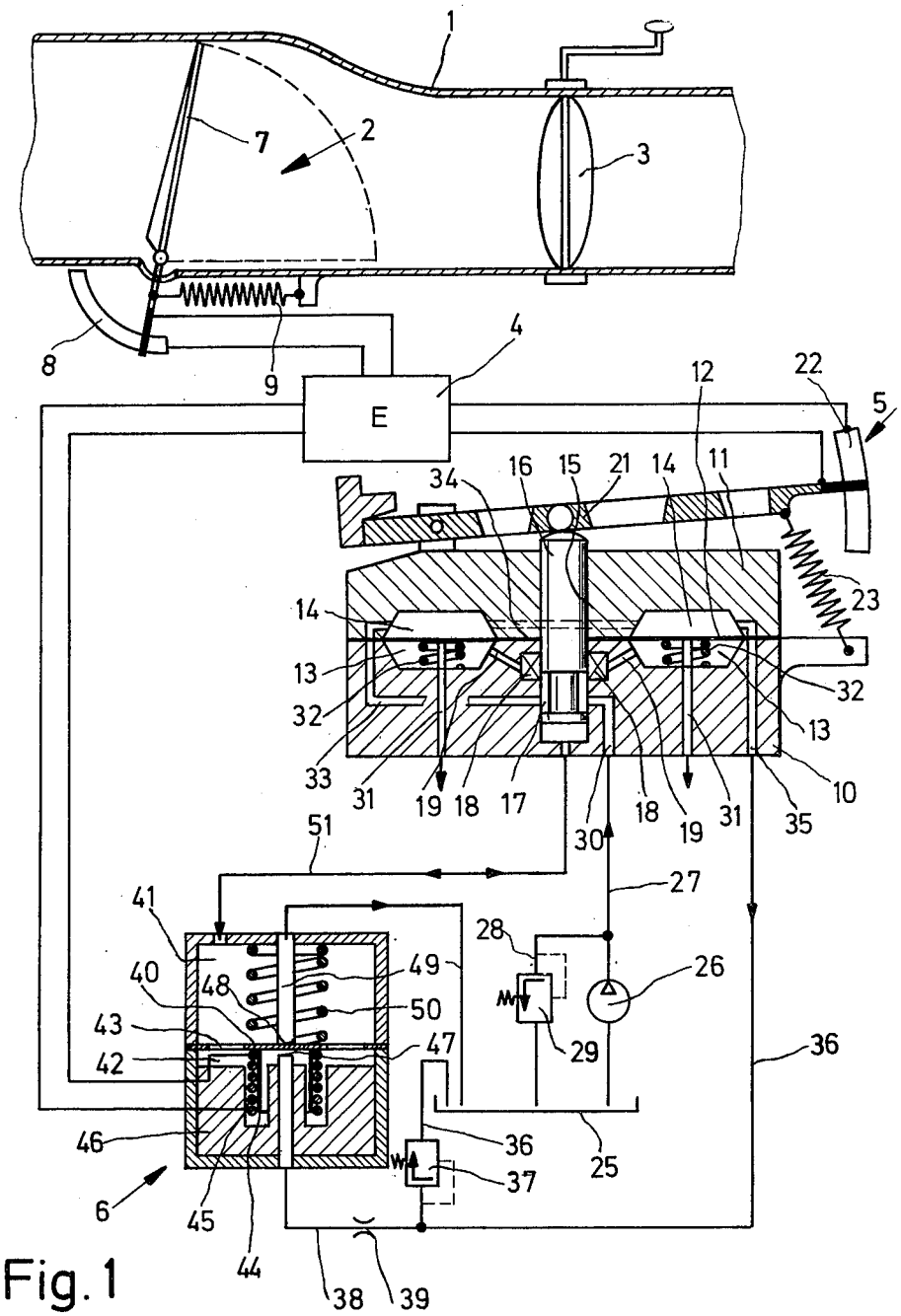
FIG. 1 is a diagrammatic illustration of a first exemplary embodiment of a fuel metering and injection system according to the present invention in which electrical position indicators are used for the air quantity measurement and the fuel quantity measurement.
Figure 2:
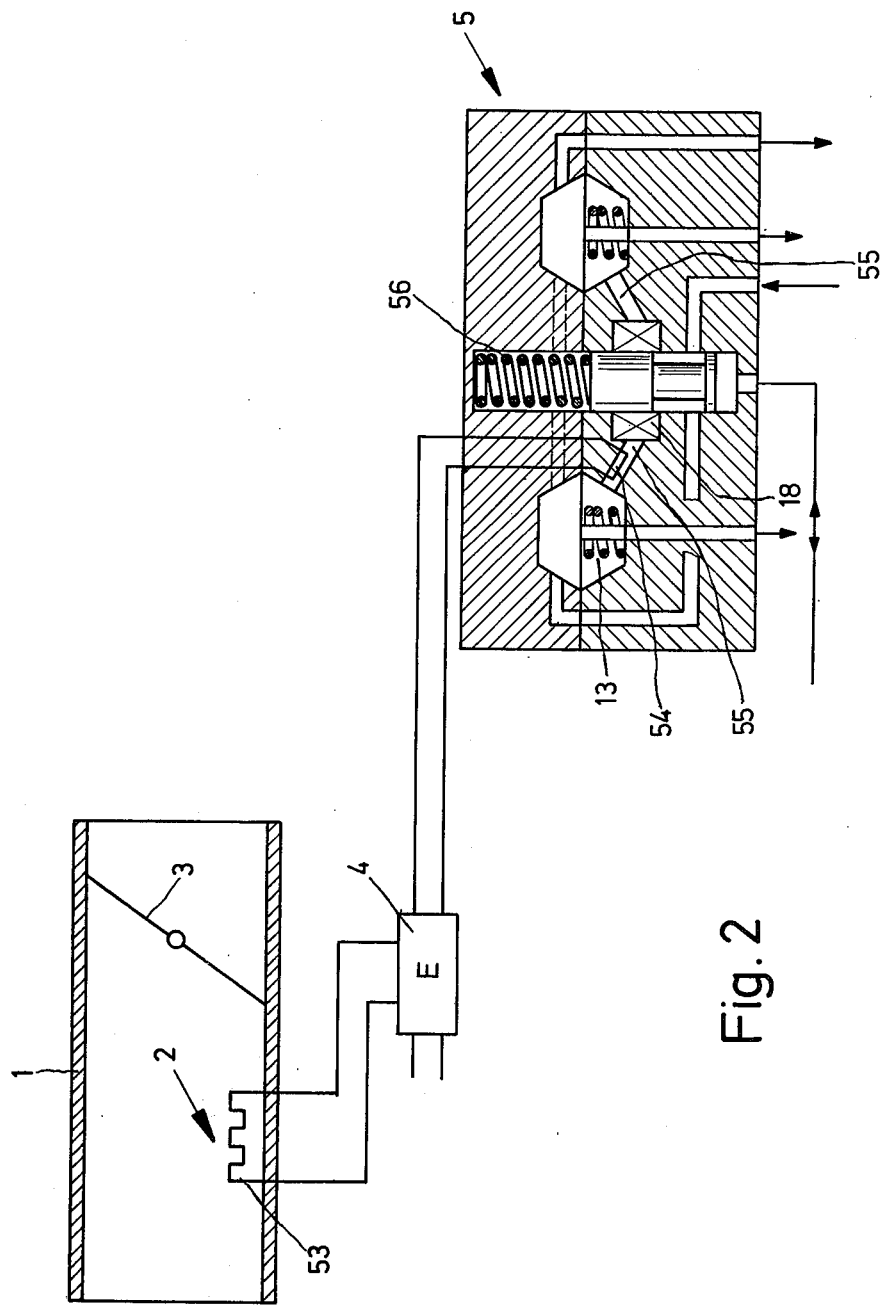
FIG. 2 is a diagrammatic illustration of a second exemplary embodiment of a fuel metering and injection system according to the present invention in which temperature-dependent resistors are used for the air quantity measurement and the fuel quantity measurement.

Referring to FIGS. 1 and 2, the illustrated fuel metering and injection systems, according to the present invention, include a conventional air intake suction tube 1. Inside the suction tube 1 there is disposed an air measuring element 2, associated with an electrical circuit, and followed by a throttle flap 3 positioned downstream from the air measuring element 2. The air measuring element 2 produces, in its associated electrical circuit, a variable electrical output signal which is compared, in an electrical control unit 4, with the magnitude of an electrical output signal from a further electrical circuit operatively associated with a fuel measuring element. This further electrical circuit operates in conjunction with a fuel metering and distribution unit, generally designated by the numeral 5. The comparison with the electrical control unit 4 results in the formation of an electrical control signal which controls the pressure of a fluid that determines the quantity of fuel injected.

The details of the electrical control unit 4 are not necessary for purposes of the present invention, although it may be stated that the circuit disclosed in U.S. Pat. No. 3,796,199, issued to Heinrich Knapp and assigned to the assignee of the present application, could be adapted for use as the control unit 4. It would only be necessary to utilize the potentiometer 8 of the air measuring element 2 in place of the temperature sensing means in the intake tube 43, and the potentiometer 22 for the temperature sensing means in the chamber 17. The operational amplifier 67 would then compare the signals from the potentiometers 8 and 22 and adjusts the pressure control unit 6 accordingly.

In the embodiment shown in FIG. 1, an air flap 7, hinged at one of its edges, serves as the measuring element 2; it actuates a potentiometer 8 and pivots in opposition to the force of a weak return spring 9. A membrane 12 is tensioned between a housing 10 and a cover 11 of the metering and distribution unit 5; this membrane separates chambers 13 and 14 from one another. There are as many chambers 14 and 13 in the distribution unit 5 as there are injection nozzles leading to the combustion engine and they are preferably disposed symmetrically about the mean axis of the distribution unit 5. (For the sake of clarity, each of the figures shows only two pairs of such chambers.)

In a central bore 15, which penetrates the cover 11 and nearly penetrates the housing 10, there is disposed an axially slidable slide-valve piston 16 having an annular groove 17 in its exterior surface. The upper control edge of this annular groove 17 cooperates with metering slits 18 disposed in housing 10 to form a fuel metering valve aperture; the metering slits communicate with the chambers 13 through bores 19. The motion of the slide-valve piston 16 is transferred to a lever 21 and hence to a potentiometer 22 whose variable electrical output signal is fed to the electrical control unit 4. The lever 21 is biased by a very weak spring 23 which also provides a return force for the slide-valve piston 16.

The fuel is pumped from a fuel container 25 by an electric supply pump 26 and is carried through a conduit 27 to the metering and distribution unit 5. A conduit 28 branches off from the conduit 27 and leads back to the container 25; a pressure sustaining valve 29 is disposed in the conduit 28. Fuel from the conduit 27 flows to a channel 30 in the distribution unit 5; this channel is in constant communication with the annular groove 17 of the slide-valve piston 16. Fuel flows from this annular groove through the metering slits 18, through the bore 19 into the chambers 13 and thence through conduits 31 to the individual injection valves (not shown). The conduits 31 extend into the chambers 13 and cooperate with the membrane 12 to form a valve which also includes a spring 32 whose purpose is to ensure that this valve is normally open. A portion of the supplied fuel, in particular a largely constant amount, flows from the annular groove 17 through a channel 33 into the chambers 14 which are connected with one another in series by the openings 34, so that the fuel can flow from the last chamber 14 of the series through a channel 35 and a conduit 36 back to the container 25. A pressure sustaining valve 37 is disposed in the conduit 36.

Air bubbles which may have accumulated on the membrane 12 are swept away by the fuel streaming through the chambers 14. The stiffness of the membrane 12 and the strength of the springs 32 are chosen so that during a change of the intended pressure difference between the two chambers 13 and 14, the flow aperture cross section obtaining between the membrane 12 and the conduit 31 changes until the intended pressure difference has been attained again.

A conduit 38 branches off from the conduit 36 and a pressure reducing valve or a throttle 39 is disposed in the conduit 38 so as to uncouple the hydraulic system following this throttle 39 from the system already described above. Fuel is supplied through the conduit 38 to a pressure control unit 6 which is developed as a membrane valve actuated by a moving coil. A membrane 40 separates two chambers 41 and 42 which communicate through apertures 43 in the membrane 40. A moving coil armature 44 carrying an exciter coil 45 is attached to the membrane 40 and is supplied with the electrical control signal coming from the control unit 4. The armature 44 and the coil 45 cooperate with a magnet 46. The conduit 38 terminates a short distance in front of the membrane 40, forming a valve seat 47 so that during an appropriate excursion of the membrane 40, the conduit 38 can be closed off. On the other side of the membrane 40 and opposite the valve seat 47 there is provided a valve seat 48 associated with a drainage line 49 which leads back to the container 25. In addition, the membrane 40 is loaded by a spring 50 acting in the direction toward the valve seat 47. From the chamber 41 a conduit 51 leads to the metering and distribution unit 5 and terminates at the front surface of the slide-valve piston 16 facing away from the lever 21. The quantity of fuel which is admitted through the conduit 38 or which drains through the drainage line 49 and which depends on the position of the moving coil 45 associated with the magnet 46, causes the slide-valve piston 16 to be displaced a smaller or greater distance and this displacement changes the quantity of fuel to be injected. The control of the valve seats 47 and 48 by the membrane 40 can occur intermittently but it can also occur by slow continuous displacement, depending on whether an integral or a proportional characteristic of the regulation is desired.

The operation of the fuel metering and injection system illustrated in FIG. 1 should be clearly evident from the above detailed description. By way of summary, the signal produced by the potentiometer 8 due to the deflection of the air flap 7 is compared with the signal produced by the potentiometer 22 of the fuel metering and distribution unit 5 due to the pivotal movement of the lever 21. The result is a signal to the pressure control unit 6 and specifically to the coil 45 of the coil armature 44 to thereby attract the membrane 40 toward either one of the two valve seats 47,48 shown in FIG. 1. For example, the greater the deflection of the air flap 7 the greater should be the displacement of the slide valve piston 16 in the upward direction when viewing FIG. 1 to thereby produce a greater fuel quantity. To achieve this, the coil 45 is excited causing the armature 44 to be displaced upwardly thereby moving the membrane 40 toward the valve seat 48. This tends to increase the pressure in the line 51 and consequently to the bottom side of the slide valve piston 16 causing it to move upwardly.

In the second exemplary embodiment of FIG. 2, the air measuring element 2 is a temperature-dependent resistor 53 and instead of employing a potentiometer to measure the fuel quantity metered in the metering and distribution unit 5, it is also measured by a temperature-dependent resistor 54, which is disposed in a correspondingly enlarged bore 55 connecting the slits 18 with the chambers 13. In conformance with the layout of the entire metering and distribution unit 5, the measurement in a single bore 55 suffices in most cases because all of these bores carry the same quantity of fuel. A hot wire can preferably serve as the temperature-dependent resistor. However, the metered fuel can also be determined as the difference between the measured quantities of supply and drainage in the annular groove 17.

It is to be appreciated that the above-described and illustrated exemplary embodiments of fuel metering and injection systems constructed in accordance with the present invention have been provided as non-limiting examples. Numerous changes may be made in the illustrated embodiments and other embodiments constructed without departing from the spirit and scope of the invention, as defined in the appended claims.

That which is claimed is:

1. A fuel metering and injection system for regulating fuel flow so as to maintain a desired fuel-air mixture in an internal combustion engine, the system comprising, in combination:
   a. an air intake suction tube of the internal combustion engine;
   b. electro-mechanical means for measuring the quantity of air passing through said air intake suction tube;
   c. pressure control means, responsive to the output from said electro-mechanical means for measuring, for generating a variable pressure head;
   d. means for establishing a given force;
   e. fuel distribution means in fluid communication with said control means and including at least one fuel metering valve having a movable member which can be actuated, against a restoring force provided by said means for establishing the given force, by the fluid pressure head; whereby the fuel quantity is metered.

2. A system according to claim 1, wherein said means for establishing a given force comprises a spring having a small spring constant.

3. A system according to claim 1, further comprising a fuel pump, a plurality of control valves with control slits, and wherein said movable valve member is a slide-valve piston which has an axis and is part of said fuel distribution means and includes an annular groove in which fuel is passed from said fuel pump through said annular groove of said sliding valve piston to each control valve of said plurality of control valves for changing their effective flow cross section, each of said control valves including a resilient member separating first and second chambers where pressure prevailing downstream of said distribution means is present in said first chamber and acts upon said resilient member, and wherein said second chamber is provided with pressure prevailing upstream of said distribution means, said effective flow cross section of said sliding-valve piston being changeable linearly by axial sliding of said slide-valve piston, its annular groove exposing, depending on its axial position, to variable extent said slits assigned to each said control valve, these slits being parallel to substantially said axis of said sliding-valve piston.

4. A system according to claim 3, wherein at least a part of fuel provided by said fuel pump flows continually and sequentially through said second chambers.

5. A system according to claim 1, further comprising a conduit and a pressure control means, and wherein control fluid is fuel supplied to said movable valve member through said conduit in which is disposed said pressure control means.

6. A system according to claim 5, wherein said pressure control means is formed by a valve having at least two control positions, and whose outlet end experiences virtually no hydraulic counterpressure.

7. A system according to claim 5, wherein said pressure control means comprises a pressure control valve which operates intermittently.

8. A system according to claim 5, further including means responsive to at least one additional engine operating parameter and wherein said pressure control means comprises a nearly hysteresis-free electric solenoid valve, whose magnetic field is changeable in dependence on air quantity streaming through said suction tube and on said means responsive to at least one additional engine parameter (load, temperature and/or exhaust contaminants).

9. A system according to claim 8, wherein said solenoid operates via a coil armature associated with a permanent magnet or a magnet having constant external excitation.

10. A system according to claim 8, wherein said pressure control means includes a movable valve member in the form of a membrane.

11. A system according to claim 1, wherein said electro-mechanical means measuring the quantity of air in said suction tube is coupled to electrical circuit means which generate an electrical signal corresponding to air quantity and which determines the magnitude of the control variable of said pressure control means.

12. A system according to claim 11, including additional electrical circuit means and a comparator, and wherein the amount of fuel metered is measured by said additional electrical circuit means to produce a measured signal and this measured signal is compared in said comparator with the electrical signal corresponding to the quantity of air to produce a difference control signal which determines the magnitude of the control provided by said pressure control means.

13. A system according to claim 11, including a position indicator, and wherein said movable member of said fuel metering valve and thus the metered fuel quantity is measured by said position indicator.

14. A system according to claim 13, wherein said position indicator is a potentiometer, whose movable part is activated at least mediately by said movable member of said fuel metering valve.

15. A system according to claim 13, wherein said position indicator is inductive in nature.

16. A system according to claim 13, further comprising a roller and a lever moving a first end and a bearing end, and wherein said movable member of said fuel metering valve transfers its motion via said roller to said lever mounted eccentrically, whose first end opposite to its said bearing end carries a pick-up portion forming said position indicator.

17. A system according to claim 11, further including a position indicator, and wherein said electro-mechanical means for measuring the quantity of air comprises a static plate operatively associated with said position indicator.

18. A system according to claim 11, including a pressure control unit and a temperature dependent resistor, said temperature dependent resistor being disposed within said pressure control unit.

19. A system according to claim 11, wherein said electro-mechanical means for measuring the quantity of air includes at least one temperature-dependent resistor disposed within said suction tube and responsive to the air stream therein.

20. A system according to claim 11, further including a bridge circuit measuring fuel quantity, and wherein said electro-mechanical means for measuring the quantity of air includes at least one temperature-dependent resistor disposed within said suction tube and serving as one resistor of a further bridge circuit, whose characteristic curve approximates that of said bridge circuit measuring fuel quantity.

* * * * *